United States Patent [19]

Hoshino et al.

[11] 4,098,749

[45] Jul. 4, 1978

[54] ANTICORROSION PRIMER COATING COMPOSITION

[75] Inventors: Minoru Hoshino, Yokohama; Toshio Shinohara, Fujisawa; Yukio Kawahara, Yamato; Katsuji Takase, Yokohama; Toshimoto Tsuji, Yokohama; Jun-ichi Fukuda, Yokohama, all of Japan

[73] Assignee: Dai Nippon Toryo Co., Ltd., Osaka, Japan

[21] Appl. No.: 780,994

[22] Filed: Mar. 24, 1977

[51] Int. Cl.² ............... C08J 3/00; C08K 3/18; C09D 5/08; C08K 5/49
[52] U.S. Cl. .................. 260/30.6 R; 106/15; 106/14.41; 260/29.1 SB; 260/29.6 MM; 260/29.6 RB; 260/30.6 SB
[58] Field of Search .......... 260/30.6 R, 30.6 SB, 260/29.6 RB, 29.6 MM, 29.1 SB; 106/14

[56] References Cited

U.S. PATENT DOCUMENTS

| | | | |
|---|---|---|---|
| 2,818,344 | 12/1957 | Buckman | 106/15 AF |
| 3,508,933 | 4/1970 | Yates | 106/14 |
| 3,509,196 | 4/1970 | Plueddemann et al. | 106/14 |
| 3,791,850 | 2/1974 | Deshay et al. | 428/328 |
| 3,803,048 | 4/1974 | Hwa | 106/14 |
| 3,808,018 | 4/1974 | Plueddemann | 260/29.1 SB |
| 3,892,577 | 7/1975 | Sugahara et al. | 106/1 X |
| 3,960,735 | 6/1976 | Lacey | 106/14 |
| 3,961,991 | 6/1976 | Yoshida et al. | 106/14 |
| 3,963,472 | 6/1976 | Young | 106/14 |

OTHER PUBLICATIONS

Bayliss et al., Jour. Oil & Colour Chem. Ass., vol. 51 #9, Sep. 1968, "Prefabrication Primers for Structural Steelwools", Pt. II.

*Primary Examiner*—Herbert J. Lilling
*Attorney, Agent, or Firm*—Haseltine, Lake & Waters

[57] ABSTRACT

The present invention relates to an anticorrosion primer coating composition comprising (i) a polyvinyl butyral resin, (ii) an organo functional silane, (iii) at least one member selected from the group consisting of inorganic borate compounds and polyphosphate compounds, and (iv) phosphoric acid.

10 Claims, No Drawings

ANTICORROSION PRIMER COATING COMPOSITION

BACKGROUND OF THE INVENTION (1) Field of the Invention:

The present invention relates to an anticorrosion primer coating composition for metals of the type generally called a "wash primer", "shop primer", "etch primer" or "prefabrication primer". More particularly, the invention relates to an anticorrosion primer coating composition for metals which comprises as indispensable components (i) a polyvinyl butyral resin, (ii) an organo functional silane, (iii) at least one member selected from the group consisting of borate compounds and polyphosphate compounds and (iv) phosphoric acid and which may further comprise a phenolic resin and/or a metal powder according to need.

(2) Description of the Prior Art:

Steel frames and metal sheets or plates for steel structures such as ships and bridges have heretofore been ordinarily coated with anticorrosion primer coating paints, that is, shop primers, after complete removal of rust and mill scales by sand blasting so as to prevent rusting during processing or fabrication.

For example, D. A. Bayliss et al. proposed and examined various prefabrication primers (shop primers) in the Journal of the Oil and Colour Chemists' Association, 51, pages 792–915 (1968) published by the Oil and Colour Chemists' Association.

Shop primers include wash primers for which the conversion treatment is conducted simultaneously with the coating operation, namely shop primers called "shop primers of the conversion treatment type".

A typical composition for such wash primer comprises a polyvinyl butyral resin as a vehicle, phosphoric acid, chromic anhydride, zinc chromate and an alcohol.

The above-mentioned wash primer is produced in two types: a wash primer of the etching type and a wash primer of the high exposure resistance type.

The wash primer of the etching type is suitable for the preliminary treatment of metals to be coated and is prepared by dissolving a polyvinyl butyral resin in an alcohol, kneading and grinding a zinc chromate pigment with the resulting solution and adding an additive containing phosphoric acid to the thus prepared main composition. In general, wash primers of this type are used when top coating is effected within a short time from the primer coating and are applied so as to improve adherence between a metal substrate and a top coating layer. In other words, it is not such a strict requirement for single layers of wash primers of the etching type to have high corrosion resistance as it is for wash primers of the high exposure resistance type.

As the wash primer of the etching type, there has long been known a composition comprising a polyvinyl butyral resin, phosphoric acid and zinc tetraoxychromate (see the specification of U.S. Pat. No. 2,525,107). There is also known a composition comprising a modified vinyl resin obtained by reacting chromium trioxide and phosphoric acid with a vinyl resin and basic zinc chromate (see the specification of U.S. Pat. No. 2,488,651).

The wash primer of the latter type, namely the wash primer of the high exposure resistance type, comprises a main composition comprising a polyvinyl butyral resin and a phenolic resin as a vehicle and a zinc chromate pigment kneaded and ground with the vehicle and an additive including an alcohol solution of phosphoric acid. In general, the main composition is mixed with the additive at the time of application and the resulting coating composition is applied to form a coating layer excellent in adhesion to a metal substrate and to a top coat paint. Since the wash primer of this type is used when top coating is applied after the lapse of a long time from formation of the primer coating, the wash primer of this type is required to have such a corrosion resistance that the primer coating is resistant to exposure for at least about 6 months.

A typical composition for such wash primer of the high exposure resistance type is disclosed in the specification of U.S. Pat. No. 3,791,850.

In the art, wash primers of the high exposure resistance type have heretofore been mainly used as shop primers.

As will be apparent from the foregoing, conventional wash primers include a zinc chromate pigment or chromic anhydride. Therefore, they entail a problem of chromium pollution. Namely, workers breathe in spray dust formed in the coating step and their health is impaired by chromium ions contained in such spray dust.

This chromium pollution is now a serious social problem, and development of an anti-pollution wash primer has been eagerly desired in the art.

For example, attempts have heretofore been made to replace zinc chromate pigments by other anti-pollution pigments. However, coatings formed from wash primers containing such pigments are defective in the corrosion resistance and adhesion. Thus, no practical anti-pollution wash primer has yet been developed in the art.

For example, although an anticorrosion primer paint comprising a polyvinyl butyral resin, zinc chromate and barium metaborate is disclosed in Japanese Patent Public Discloure No. 44322/73, in this primer paint only a part of the zinc chromate is replaced by barium metaborate and the hygienic problem of prevention of harmful pollution is not completely solved. Further, as is taught in this publicly disclosed specification, a coating from a a primer comprising a polyvinyl butyral resin and barium metaborate alone is extremely poor in corrosion resistance and though this wash primer is free of chromium and does not cause a pollution problem, it cannot be used practically.

Further, a paint composition comprising an oil varnish, oil-modified alkyd resin or drying oil as a vehicle and barium borate is known in the art (see the specification of U.S. Pat. No. 2,818,344), but this composition only provides a film having improved mold resistance or chalk resistance and has few properties required of a wash primer.

Still further, the specifications of U.S. Pat. Nos. 3,272,663 and No. 3,528,860 teach that a molybdate compound is used as an anticorrosion pigment for the wash primer. However, paints of this type are still insufficient in corrosion resistance.

Moreover, an attempt has been made to replace a zinc chromate pigment by a phosphate, for example, zinc phosphate (see the above-mentioned D. A. Bayliss et al. reference). Furthermore, a flame or corrosion resistant paint comprising a white pigment such as silicon phosphate, zirconium phosphate, zinc phosphate or titanium phosphate and an alkyd resin, epoxy resin air-drying oil, phenolic resin, polyvinyl acetate resin, vinyl chloride resin or polyvinyl acetal resin is known in the art (see the specification of U.S. Pat. No. 3,892,577). These paints, however, have few of the properties required of a wash primer.

As one kind of shop primer, there is known a so-called zinc rich primer formed by incorporating zinc dust at a high concentration in a vehicle. Although this primer has a very high corrosion resistance, it has a fatal defect of poor weldability. Namely, when a steel material coated with this primer is subjected to the welding operation, blow holes are formed by a gas generated from the primer coating and the weld strength is drastically reduced. Furthermore, fumes of zinc generated at the step of welding of the primer-coated material has serious influences on the health of workers and the problem of maintenance of good health conditions is left unsolved.

From a different view point, a so-called electroprint marking process in which an image is directly formed and developed on a coated steel plate according to the electroprint process has recently been adopted in the ship-building industry so as to save labor.

In this case, a paint excellent in both electric conductivity and corrosion resistance is ordinarily applied to a steel plate, and a wash primer to which electric conductivity has been imparted is especially used for formation of such electrically conductive corrosion-resistant coating. Development of a wash primer free of chromium and capable of eliminating safety and health problems has also been desired in this field where a wash primer is utilized in the electroprint marking process.

As will be apparent from the foregoing, shop primers excellent in corrosion resistance, adhesion to a top coating or over-coating (over-coatability), weldability, adaptability to the electroprint marking process and operation safety (freedom from environmental and hygienic problems at various operation steps) have not yet been developed in the art.

The present invention has now been achieved as a result of our research work made with a view to developing primer coating compositions which overcome the foregoing defects involved in conventional coating compositions.

SUMMARY OF THE INVENTION

The present invention relates to a novel anticorrosion primer coating composition.

It is a primary object of the present invention to provide an anticorrosion primer coating composition which does not cause environmental pollution, especially chromium pollution.

Another important object of the present invention is to provide an anticorrosion primer coating composition capable of providing a coating excellent in physical and chemical properties such as corrosion resistance, weldability, adaptability to weld cutting, adherence and the like.

Still another object of the present invention is to provide an anticorrosion primer coating composition excellent in adaptability to the electroprint marking process.

More specifically, in accordance with the present invention, there is provided an anticorrosion primer coating composition of the etching type comprising (i) a polyvinyl butyral resin, (ii) an organo functional silane, (iii) at least one member selected from the group consisting of borate compounds and polyphosphate compounds and (iv) phosphoric acid. In accordance with the present invention, there also is provided an anticorrosion primer coating composition of the high exposure resistance type formed by incorporating a phenolic resin into the above primer coating composition of the etching type. Further, in accordance with the present invention, there is provided an anticorrosion primer coating composition having good adaptability to the electroprint marking process, which is formed by adding a metal powder to the above-mentioned anticorrosion primer coating composition of the etching type or high exposure resistance type.

DETAILED DESCRIPTION OF THE INVENTION

Commercially available polyvinyl butyral resins having an average degree of polymerization of about 500 to about 1000 and a degree of butyration of about 57 to about 70 mole % can be directly used as the polyvinyl butyral resin (i) in the present invention.

As the organo functional silane (ii) that can be used in the present invention, there can be mentioned, for example, aminoalkoxysilanes represented by the following formula:

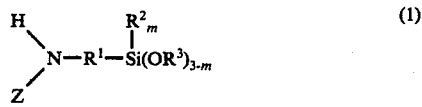

wherein $R^1$ stands for a divalent hydrocarbon group having 1 to 4 carbon atoms, $R^2$ and $R^3$ represent a monovalent hydrocarbon group having 1 to 4 carbon atoms, Z stands for a hydrogen atom or an aminoalkyl group, and m is 1 or 0 (zero), and alkylalkoxysilanes represented by the following formula:

wherein $R^4$ stands for a divalent hydrocarbon group having 1 to 4 carbon atoms, $R^5$ and $R^6$ represent a monovalent hydrocarbon group having 1 to 4 carbon atoms, Q stands for a methacryloxy, acryloxy, glycidoxy or epoxycyclohexyl group, and n is 1 or 0 (zero).

As typical instances of the compounds represented by the general formula (1), there can be mentioned aminomethyltriethoxysilane, N-(β-aminoethyl)-aminomethyltrimethoxysilane, aminomethyldiethoxysilane, N-(aminoethyl)-aminomethyltributoxysilane, γ-aminopropyltriethoxysilane, γ-aminopropylmethyldiethoxysilane, γ-aminoisobutyltrimethoxysilane, N-(β-aminoethyl)-γ-aminopropyltrimethoxysilane and N-(β-aminoethyl)-γ-aminopropylmethyldimethoxysilane.

As typical instances of the compound represented by the general formula (2), there can be mentioned γ-glycidoxypropyltrimethoxysilane, γ-glycidoxypropylmethyldimethoxysilane, β-(3,4-epoxycyclohexyl)-ethyltrimethoxysilane, β-(3,4-epoxycyclohexyl)-ethyltriethoxysilane, β-(3,4-epoxycyclohexyl)-ethylmethyldimethoxysilane and γ-methacryloxypropyltrimethoxysilane.

Further, organo functional silanes containing a vinyl group, such as vinyltriethoxysilane and vinyl-tris-β-methoxyethoxysilane, can be used as the component (ii) in the present invention.

The foregoing organo functional silanes can be used singly or they may be used in the form of a mixture of two or more of them.

Among the foregoing organo functional silanes, alkoxysilane compounds represented by the formula (2) are preferably employed, and use of β-(3,4-epoxycyclohexyl)-ethyltrimethoxysilane, γ-glycidoxypropyltrimethoxysilane and —methacryloxypropyltrimethoxysilane is especially preferred.

As the borate compound that can be used as component (iii) in the present invention, there can be mentioned, for example, zinc borate ($2ZnO.3B_2O_3.3.5H_2O$), barium borate ($BaB_2O_4.H_2O$), calcium borate ($CaO.B_2O_3.5H_2O$), potassium tetraborate ($K_2B_4O_7.5H_2O$), calcium tetraborate $CaB_4O_7.6H_2O$), sodium tetraborate ($Na_2B_4O_7$) barium tetraborate ($BaB_4O_7$), manganese tetraborate ($MnB_4O_7.8H_2O$), zinc tetraborate ($ZnB_4O_7$), lithium tetraborate ($Li_2B_4O_7$), magnesium metaborate ($Mg_2B_2O_4.8H_2O$) and aluminum orthoborate ($Al_2O_3.B_2O_3$). These borates may be used singly or in the form of a mixture of two or more of them. Use of zinc borate and/or barium borate is especially preferred.

As the polyphosphate compound that can be used as other type of the component (iii) in the present invention, there can be mentioned compounds obtained by reacting phosphoric acid with a di- to hexa-valent metal or its oxide or hydroxide (presented as "X") at a $P_2O_5/X$ molar ratio in the range of from 1 to 6 under heating to effect condensation.

As the reactant X, there can be mentioned, for example, metals such as Mg, Al, Ca, Zn, Mn, Fe and Ba, oxides such as MgO, $Al_2O_3$, CaO, ZnO, $MnO_2$, FeO, $MoO_3$, BaO and $WO_3$, and hydroxides such as $Mg(OH)_2$, $Al(OH)_3$, $Ca(OH)_2$, $Zn(OH)_2$, $Ba(OH)_2$ and $Fe(OH)_3$.

These polyphosphate compounds can be used singly or in the form of a mixture of two or more of them. Use of zinc polyphosphate, aluminum polyphosphate, calcium polyphosphate and mixtures of two or more of them is especially preferred. Commercially available aluminum polyphosphate K-50, K-80 and K-82 (trademarks for products manufactured by Teikoku Kako Co., Ltd.) and HB Hardener (trademark for the product Hoechst AG) are conveniently used in the present invention.

Phosphoric acid that is used as component (iv) in the present invention is an acid formed by hydration of diphosphorus pentoxide.

More specifically, there can be mentioned metaphosphoric acid, pyrophosphoric acid, orthophosphoric acid, triphosphoric acid, tetraphosphoric acid and the like. These phosphoric acids may be used singly or in the form of a mixture of two or more of them.

Any of metal powders capable of imparting an electric conductivity to the resulting coatings can be used as the metal powder in the present invention. Ordinary metal powders having a size of about 500 to about 180 mesh can be used in the present invention. More specifically, in the present invention there can be used aluminum powder and powders of alloys of aluminum with at least one metal selected from the group consisting of zinc, magnesium, tin, silicon, copper and manganese. Use of aluminum powder is especially preferred.

In the present invention, these metal powders can be used singly or in the form of a mixture of two or more of them.

The anticorrosion primer coating composition according to another embodiment of the present invention further comprises a phenolic resin. Commercially available phenolic resins for paints can be directly used for this embodiment of the present invention. These phenolic resins are ordinarily formed by condensing a phenol with an aldehyde according to a customary method and they have an average molecular weight of about 100 to about 1000.

In the present invention, good results are obtained when 100 parts by weight of a polyvinyl butyral resin is mixed with 20 to 350 parts by weight, preferably 50 to 250 parts by weight, of at least one member selected from the group consisting of borate compounds and polyphosphate compounds, 1 to 25 parts by weight, preferably 3 to 15 parts by weight, of an organo functional silane and 5 to 50 parts by weight, preferably 15 to 40 parts by weight, of phosphoric acid.

When using a mixture of a borate compound and polyphosphate compound, the mixing weight ratio of borate compound and polyphosphate compound is from 9/1 to 1/9, preferably from 8/2 to 4/6.

When the amount of the mixture of the borate compound and polyphosphate compound or the amount of the organo functional silane is outside the above-mentioned range, reduction of the corrosion resistance is observed.

In this embodiment of the present invention using a phenolic resin, it is preferred that up to 200 parts by weight, especially 70 to 170 parts by weight, of the phenolic resin be incorporated in 100 parts by weight of the polyvinyl butyral resin. When the amount of the phenolic resin exceeds 200 parts by weight per 100 parts by weight of the polyvinyl butyral resin, the adhesion to the top coating or over-coating (over-coatability) is reduced.

When a metal powder is incorporated in the anticorrosion primer coating composition of the present invention, the metal powder is used in an amount of 10 to 130 parts by weight, preferably 15 to 90 parts by weight, per 100 parts by weight of the polyvinyl butyral resin. When the amount of the metal powder is smaller than 10 parts by weight per 100 parts by weight of the polyvinyl butyral resin, the adaptability to the electroprint marking process is degraded, and when the amount of the metal powder is larger than 130 parts by weight per 100 parts by weight of the polyvinyl butyral resin, the corrosion resistance or adhesion tends to decrease.

The coating composition of the present invention comprises as indispensable components (i) a polyvinyl butyral resin, (ii) an organo functional silane, (iii) at least one member selected from the group consisting of borate compounds and polyphosphate compounds and (iv) phosphoric acid.

For example, in case of a composition comprising a polyvinyl butyral resin, phosphoric acid and a borate or polyphosphate compound (namely, the composition free of an organo functional silane) or a composition comprising a polyvinyl butyral resin, phosphoric acid and an organo functional silane (namely, the composition free of a borate compound or polyphosphate compound), it is substantially impossible to obtain a coating satisfying the primary object of the present invention, namely a coating having a high corrosion resistance.

According to the present invention, a high anticorrosion effect can be obtained by an anticorrosion primer coating composition comprising a polyvinyl butyral resin, an organo functional silane, at least one member selected from borate compounds and polyphosphate compounds and phosphoric acid, which may further comprise a phenolic resin and/or a metal powder according to need.

In the coating composition of the present invention, a polyvinyl butyral resin, an organo functional silane and a borate compound and/or a polyphosphate compound are mixed and ground with a solvent customarily used for a wash primer, for example, an alcohol optionally with another pigment, such as an extender pigment or color pigment and other compatible resin or additive and further optionally with a phenolic resin and/or a metal powder to form a main composition, and the thus formed main composition is mixed with a separately prepared solution of phosphoric acid when the coating composition is actually applied.

The thus formed coating composition of the present invention is applied to a substrate to be coated, such as iron, aluminum or zinc plate or the like, according to a customary coating method.

The resulting coating formed by application of the above coating composition is tightly and closely bonded to the metal substrate by the synergistic effect of the borate compound and/or polyphosphate compound and the organo functional silane and therefore, a coating excellent in corrosion resistance can be obtained.

When the anticorrosion primer coating composition of the present invention comprising a polyvinyl butyral resin, a borate compound and/or a polyphosphate compound, phosphoric acid and an organo functional silane optionally with a metal powder is used as a wash primer of the etching type, or when the anticorrosion primer coating composition of the present invention comprising a polyvinyl butyral resin, phosphoric acid, a borate compound and/or polyphosphate compound, an organo functional silane and a phenolic resin optional with a metal powder is used as a wash primer of the high exposure resistance type, a coating excellent in corrosion resistance, weldability, adaptability to weld cutting, adaptability to electroprint marking process and over-coatability can be obtained. Further, the anticorrosion primer coating composition of the present invention is a chromium-free coating composition causing no environmental pollution and having no harmful influence on the health of workers. Accordingly, the anticorrosion primer coating composition of the present invention is industrially valuable as a shop primer.

The present invention will now be described in detail by reference to the following Examples, in which all of "parts" and "%" are by weight.

EXAMPLE 1

Main Composition

| Ingredients | Parts |
|---|---|
| Phenolic resin (Hitanol 4020 manufactured by Hitachi Chemical Co. Ltd.) | 11.0 |
| Polyvinyl butyral resin (S-LEC BM-2 manufactured by Sekisui Chemical Co. Ltd.) | 9.0 |
| Organo functional silane (KBM 303[1]) manufactured by Shinetsu Silicone Co., Ltd.) | 0.5 |
| Yellow iron oxide (Mapico Yellow) | 3.0 |
| Phthalocyanine Blue | 0.3 |
| Carbon black | 0.3 |
| Aluminum polyphosphate[2] | 2.5 |
| Talc | 5.9 |
| Barium borate[3] | 2.5 |
| Suspending agent (organic bentonite) | 1.0 |
| Butyl alcohol | 11.0 |
| Isopropyl alcohol | 25.0 |
| Toluol | 30.0 |
| Total | 100.0 |

Additive

| Ingredients | Parts |
|---|---|
| 85% Aqueous solution of phosphoric acid | 9.0 |
| Water | 5.0 |
| Isopropyl alcohol | 86.0 |
| Total | 100.0 |

Notes
[1] KBM 303: β-(3,4-epoxycyclohexyl)-ethyltrimethoxysilane
[2] Product manufactured and sold under the tradename "K-82" by Teikoku Kako Co., Ltd.
[3] Barium metaborate manufactured and sold under the tradename "Busan 11-M1" by Buckman Laboratories Co.

The ingredients of the main composition were kneaded and ground overnight, and 80 parts of the main composition was mixed with 20 parts of the additive to form a coating composition of the present invention.

The thus formed coating composition was applied to a steel plate by means of an air spray so that the thickness of the coating was 20μ, and the coating was dried in a room maintained at a temperature of 20° C and a relative humidity of 75% for 3 days and was then subjected to comparison tests to obtain the results shown in Table 4.

EXAMPLES 2 to 12

A main composition comprising the ingredients shown in Table 1 was kneaded and ground in the same manner as described in Example 1, and 85 parts of the main composition was mixed with 15 parts of the same additive as used in Example 1. The resulting composition was applied, dried and subjected to comparison tests in the same manner as described in Example 1.

Each of the thus obtained coatings was as excellent as the coating obtained in Example 1 with respect to results of the salt spray test, the outdoor exposure test and the over-coatability test.

Table 1

Amounts (parts) of Ingredients in Main Composition

| Ingredients | Example 2 | Example 3 |
|---|---|---|
| Phenolic resin | 8.0 | 9.0 |
| Polyvinyl butyral resin | 9.0 | 9.0 |
| Organo functional silane | 0.3[1] | 1.0[2] |
| Yellow iron oxide | 3.0 | 3.0 |
| Carbon black | 0.3 | 0.3 |
| Phthalocyanine Blue | 0.3 | 0.3 |
| Borate compound | 5.0[5] | 15.0[6] |
| Polyphosphate compound | 5.0[8] | 5.0[9] |
| Suspending agent | 1.0 | 1.0 |
| Talc | — | — |
| Butyl alcohol | 11.0 | 11.0 |
| Isopropyl alcohol | 28.2 | 25.0 |
| Toluol | 28.9 | 20.4 |
| Total | 100.0 | 100.0 |

| Ingredients | Example 4 | Example 5 |
|---|---|---|
| Phenolic resin | 7.0 | 11.0 |
| Polyvinyl butyral resin | 9.0 | 9.0 |
| Organo functional silane | 1.3[3] | 0.5[4] |
| Yellow iron oxide | 3.0 | 3.0 |
| Carbon black | 0.3 | 0.3 |
| Phthalocyanine Blue | 0.3 | 0.3 |
| Borate compound | 10.0[7] | — |
| Polyphosphate compound | 10.0[10] | 5.0[8] |
| Suspending agent | 1.0 | 1.0 |
| Talc | — | 3.0 |
| Butyl alcohol | 11.0 | 11.0 |
| Isopropyl alcohol | 25.0 | 25.0 |
| Toluol | 22.1 | 30.0 |
| Total | 100.0 | 100.0 |

| Ingredient | Example 6 | Example 7 |
|---|---|---|
| Phenolic resin | 8.0 | 9.0 |
| Polyvinyl butyral resin | 9.0 | 9.0 |
| Organo functional silane | 0.3[1] | 1.0[2] |
| Yellow iron oxide | 3.0 | 3.0 |
| Carbon black | 0.3 | 0.3 |
| Phthalocyanine Blue | 0.3 | 0.3 |

Table 1-continued

Amounts (parts) of Ingredients in Main Composition

| | | |
|---|---|---|
| Borate compound | — | — |
| Polyphosphate compound | 10.0[9] | 20.0[8] |
| Suspending agent | 1.0 | 1.0 |
| Talc | — | — |
| Butyl alcohol | 11.0 | 11.0 |
| Isopropyl alcohol | 28.2 | 25.0 |
| Toluol | 28.9 | 20.4 |
| Total | 100.0 | 100.0 |

| Ingredient | Example 8 | Example 9 |
|---|---|---|
| Phenolic resin | 7.0 | 11.0 |
| Polyvinyl butyral resin | 9.0 | 9.0 |
| Organo functional silane | 1.3[3] | 0.5[4] |
| Yellow iron oxide | 3.0 | 3.0 |
| Carbon black | 0.3 | 0.3 |
| Phthalocyanine Blue | 0.3 | 0.3 |
| Borate compound | — | 5.0[7] |
| Polyphosphate compound | 20.0[11] | — |
| Suspending agent | 1.0 | 1.0 |
| Talc | — | 3.9 |
| Butyl alcohol | 11.0 | 11.0 |
| Isopropyl alcohol | 25.0 | 25.0 |
| Toluol | 22.1 | 30.0 |
| Total | 100.0 | 100.0 |

| Ingredient | Example 10 | Example 11 | Example 12 |
|---|---|---|---|
| Phenolic resin | 8.0 | 9.0 | 7.0 |
| Polyvinyl butyral resin | 9.0 | 9.0 | 9.0 |
| Organo functional silane | 0.3[1] | 1.0[2] | 1.3[3] |
| Yellow iron oxide | 3.0 | 3.0 | 3.0 |
| Carbon black | 0.3 | 0.3 | 0.3 |
| Phthalocyanine Blue | 0.3 | 0.3 | 0.3 |
| Borate compound | 10.0[7] | 20.0[5] | 20.0[6] |
| Polyphosphate compound | — | — | — |
| Suspending agent | 1.0 | 1.0 | 1.0 |
| Talc | — | — | — |
| Butyl alcohol | 11.0 | 11.0 | 11.0 |
| Isopropyl alcohol | 28.2 | 25.0 | 25.0 |
| Toluol | 28.9 | 20.4 | 22.1 |
| Total | 100.0 | 100.0 | 100.0 |

Notes
[1] γ-Glycidoxypropyltrimethoxysilane manufactured and sold under the tradename "KBM 403" by Shinetsu Silicone Co., Ltd.
[2] γ-Methacryloxypropyltrimethoxysilane manufactured and sold under the tradename "KBM 503" by Shinetsu Silicon Co., Ltd.
[3] Mixture of equal amounts of KBM 303 and KBM 403 mentioned above
[4] KBM 303 mentioned above
[5] Zinc borate ($2ZnO \cdot 3B_2O_3 \cdot 3 \cdot 5H_2O$)
[6] Mixture of equal amounts of barium borate ($BaB_2O_4 \cdot H_2O$) and zinc borate
[7] Barium metaborate
[8] Aluminum Polyphosphate (same as used in Example 1)
[9] Zinc polyphosphate formed by mixing zinc oxide (ZnO) with 85% phosphoric acid so that the $P_2O_5/ZnO$ mole ratio was 3.5, gradually heating the resulting starting mixture in a porcelain crucible under agitation so that the temperature was elevated to 250° C over a period of 2 hours, heating the mixture for 4 hours in an electric furnace maintained at 400° C, cooling the heated product and then pulverizing it
[10] Zinc polyphosphate mentioned above
[11] Mixture containing the above-mentioned aluminum polyphosphate and zinc polyphosphate at a mixing weight ratio of 1:1

EXAMPLE 13

| Main Composition | |
|---|---|
| Ingredients | Parts |
| Polyvinyl butyral resin | 9.0 |
| Organo functional silane (KBM 303 mentioned above) | 0.5 |
| Barium metaborate | 2.5 |
| Aluminum polyphosphate (same as used in Example 1) | 2.5 |
| Talc | 5.0 |
| Isopropyl alcohol | 60.5 |
| Butyl alcohol | 20.0 |
| Total | 100.0 |

| Additive | |
|---|---|
| Ingredients | Parts |
| 85% aqueous solution of phosphoric acid | 18.0 |
| Water | 16.0 |
| Isopropyl alcohol | 66.0 |
| Total | 100.0 |

The ingredients of the main composition were kneaded and ground in a pot mill overnight, and 80 parts of the main composition was mixed with 20 parts of the additive to obtain a coating composition of the present invention. In the same manner as described in Example 1, the resulting coating composition was applied, dried and subjected to comparison tests to obtain the results shown in Table 4.

EXAMPLES 14 to 24

A main composition comprising the ingredients shown in Table 2 was kneaded and ground, and 85 parts of the main composition was mixed with 15 parts of the same additive as used in Example 13 to obtain a coating composition. The coating composition was coated, dried and subjected to comparison tests. It was found that each of the resulting coatings showed as excellent results in the salt spray test and overcoatability test as were shown by the coating obtained in Example 13.

Table 2

Amounts (parts) of Ingredients in Main Composition

| Example No. | Polyvinyl Butyral Resin | Organo Functional Silane | Borate Compound | Polyphosphate Compound | Isopropyl Alcohol | Butyl Alcohol | Talc | Total |
|---|---|---|---|---|---|---|---|---|
| 14 | 9.0 | 0.3[1] | 2.5[5] | 2.5[9] | 60.5 | 20.2 | 5.0 | 100.0 |
| 15 | 9.0 | 1.0[2] | 5.0[6] | 5.0[10] | 60.5 | 19.5 | — | 100.0 |
| 16 | 9.0 | 1.3[3] | 5.0[7] | 5.0[11] | 60.5 | 19.2 | — | 100.0 |
| 17 | 9.0 | 0.5[4] | — | 5.0[9] | 60.5 | 20.0 | — | 100.0 |
| 18 | 9.0 | 0.3[1] | — | 10.0[9] | 60.5 | 20.2 | — | 100.0 |
| 19 | 9.0 | 1.0[2] | — | 5.0[11] | 60.5 | 19.5 | 5.0 | 100.0 |
| 20 | 9.0 | 1.3[3] | — | 10.0[10] | 60.5 | 19.2 | — | 100.0 |
| 21 | 9.0 | 0.5[4] | 5.0[6] | — | 60.5 | 20.0 | 5.0 | 100.0 |
| 22 | 9.0 | 0.3[1] | 10.0[6] | — | 60.5 | 20.2 | — | 100.0 |
| 23 | 9.0 | 1.0[2] | 5.0[7] | — | 60.5 | 19.5 | 5.0 | 100.0 |
| 24 | 9.0 | 1.3[3] | 10.0[8] | — | 60.5 | 19.2 | — | 100.0 |

Notes
[1] KBM 403 mentioned above
[2] KBM 503 mentioned above
[3] Mixture of KBM 303 and KBM 503 mentioned above (mixing weight ratio = 1:2)
[4] KBM 303 mentioned above
[5] Zinc borate mentioned above
[6] Barium metaborate mentioned above
[7] Zinc borate mentioned above
[8] Mixture of barium metaborate and zinc borate mentioned above (mixing weight ratio = 1:2)
[9] Aluminum polyphosphate mentioned above
[10] Zinc polyphosphate mentioned above
[11] Calcium polyphosphate prepared from a mixture of calcium oxide and 85% phosphoric acid ($P_2O_5/CaO$ mole ratio = 4) according to the same method as adopted in Example 3 for preparation of zinc polyphosphate

COMPARATIVE EXAMPLES 1 TO 8

Ingredients of a main composition indicated in Table 3 were kneaded and ground, and 80 parts of the resulting main composition was mixed with 20 parts of an additive indicated in Table 3. In the same manner as described in Example 1, the resulting composition was applied, dried and tested to obtain the results shown in Table 4.

Table 3

| Ingredients | Comparative Example 1 | Comparative Example 2 |
|---|---|---|
| Main Composition | | |
| Phenolic resin | 11.0 | 11.0 |
| Polyvinyl butyral resin | 9.0 | 9.0 |
| Yellow iron oxide | 3.0 | 3.0 |
| Carbon black | 0.3 | 0.3 |
| Phthalocyanine Blue | 0.3 | 0.3 |
| Zinc chromate | 5.0 | — |
| Suspending agent | 1.0 | 1.0 |
| Barium metaborate | — | 10.0 |
| Aluminum polyphosphate | — | — |
| Zinc molybdate[1] | — | — |
| Talc | — | — |
| Butyl alcohol | 11.0 | 11.0 |
| Isopropyl alcohol | 25.0 | 25.0 |
| Toluol | 34.4 | 29.4 |
| Additive | | |
| 85% Aqueous solution of phosphoric acid | 9.4 | 9.0 |
| Chromic anhydride | 0.2 | — |
| Water | 4.5 | 5.0 |
| Isopropyl alcohol | 85.9 | 86.0 |

| Ingredients | Comparative Example 3 | Comparative Example 4 |
|---|---|---|
| Main Composition | | |
| Phenolic resin | 11.0 | 11.0 |
| Polyvinyl butyral resin | 9.0 | 9.0 |
| Yellow iron oxide | 3.0 | 3.0 |
| Carbon black | 0.3 | 0.3 |
| Phthalocyanine Blue | 0.3 | 0.3 |
| Zinc chromate | — | — |
| Suspending agent | 1.0 | 1.0 |
| Barium metaborate | — | — |
| Aluminum polyphosphate | 10.0 | — |
| Zinc molybdate[1] | — | 10.0 |
| Talc | — | — |
| Butyl alcohol | 11.0 | 11.0 |
| Isopropyl alcohol | 25.0 | 25.0 |
| Toluol | 29.4 | 29.4 |
| Additive | | |
| 85% Aqueous solution of phosphoric acid | 9.0 | 9.0 |
| Chromic anhydride | — | — |
| Water | 5.0 | 5.0 |
| Isopropyl alcohol | 86.0 | 86.0 |

| Ingredient | Comparative Example 5 | Comparative Example 6 |
|---|---|---|
| Main Composition | | |
| Phenolic resin | — | — |
| Polyvinyl butyral resin | 9.0 | 9.0 |
| Yellow iron oxide | — | — |
| Carbon black | — | — |
| Phthalocyanine Blue | — | — |
| Zinc chromate | 8.6 | — |
| Suspending agent | — | — |
| Barium metaborate | — | 10.0 |
| Aluminum polyphosphate | — | — |
| Zinc molybdate[1] | — | — |
| Talc | 1.4 | — |
| Butyl alcohol | 20.0 | 20.0 |
| Isopropyl alcohol | 61.0 | 61.0 |
| Toluol | — | — |
| Additive | | |
| 85% Aqueous solution of phosphoric acid | 18.0 | 18.0 |
| Chromic anhydride | — | — |
| Water | 16.0 | 16.0 |
| Isopropyl alcohol | 66.0 | 66.0 |

| Ingredient | Comparative Example 7 | Comparative Example 8 |
|---|---|---|
| Main Composition | | |
| Phenolic resin | — | — |
| Polyvinyl butyral resin | 9.0 | 9.0 |
| Yellow iron oxide | — | — |
| Carbon black | — | — |
| Phthalocyanine Blue | — | — |
| Zinc chromate | — | — |
| Suspending agent | — | — |
| Barium metaborate | — | — |
| Aluminum polyphosphate | 10.0 | — |
| Zinc molybdate[1] | — | 10.0 |
| Talc | — | — |
| Butyl alcohol | 20.0 | 20.0 |
| Isopropyl alcohol | 61.0 | 61.0 |
| Toluol | — | — |
| Additive | | |
| 85% Aqueous solution of phosphoric acid | 18.0 | 18.0 |
| Chromic anhydride | — | — |
| Water | 16.0 | 16.0 |
| Isopropyl alcohol | 66.0 | 66.0 |

Note:[1] Product manufactured and sold under the tradename "Moly-White 212" by Sherwin Williams Chemicals Co., Ltd.

COMPARATIVE EXAMPLE 9

A composition comprising the ingredients shown below was kneaded and ground in a pot mill and applied to a soft steel plate by means of an air spray so that the thickness of the coating was 20μ, and the resulting coating was dried at a temperature of 20° C and a relative humidity of 70% and subjected to comparison tests to obtain the results shown in Table 4.

| Ingredients | Parts |
|---|---|
| Long-oil alkyd resin (manufactured and sold under tradename "Beckosol P-470" by Japan Reichhold Chemicals Inc.) | 31.0 |
| Barium metaborate | 15.0 |
| Talc | 30.3 |
| Zinc oxide | 1.5 |
| Dispersant | 0.2 |
| Aluminum stearate | 0.3 |
| 15% Lead naphthenate drier | 1.2 |
| 5% Manganese naphthenate drier | 0.3 |
| 5% Cobalt naphthenate drier | 0.2 |
| Xylol | 20.0 |
| Total | 100.0 |

Table 4

| Sample Coating | Salt Spray Test[1] 50 hours | Salt Spray Test[1] 150 hours | Outdoor Exposure Test[2] 3 months | Outdoor Exposure Test[2] 6 months | Over-Coatability Test (6 months or 7 days) |
|---|---|---|---|---|---|
| Example 1 | ⊙ | ⊙ | ⊙ | ⊙ | 100/100 |
| Example 5 | ⊙ | ⊙ | ⊙ | ⊙ | 100/100 |
| Example 9 | ⊙ | ⊙ | ⊙ | ⊙ | 100/100 |
| Example 13 | ⊙ | — | — | — | 100/100 |
| Example 17 | ⊙ | — | — | — | 100/100 |
| Example 21 | ⊙ | — | — | — | 100/100 |
| Comparative Example 1 | ⊙ | ○ | ⊙ | ○ | 100/100 |
| Comparative | Δ | X | Δ | X | measurement impossible |

Table 4-continued

| Sample Coating | Results of Comparison Tests | | | | Over-Coatability Test (6 months or 7 days) |
|---|---|---|---|---|---|
| | Salt Spray Test[1] | | Outdoor Exposure Test[2] | | |
| | 50 hours | 150 hours | 3 months | 6 months | |
| Example 2 | | | | | because of extreme rusting |
| Comparative Example 3 | Δ | X | Δ | X | " |
| Comparative Example 4 | Δ | X | Δ | X | " |
| Comparative Example 5 | O | ⊙ | — | — | 100/100 |
| Comparative Example 6 | X | — | — | — | 100/100 |
| Comparative Example 7 | X | — | — | — | 100/100 |
| Comparative Example 8 | X | — | — | — | 100/100 |
| Comparative Example 9 | Δ | X | O | X | 90/100 |

Notes
[1]The salt spray test was conducted by using a 5% aqueous solution of NaCl. The test results were evaluated according to the scale indicated below.
[2]The outdoor exposure test results were evaluated according to the scale indicated below.
[3]A chlorinated rubber type paint was used as an overcoat paint and the adhesion to the overcoating was evaluated according to the cross-cut adhesion test (the number of cut sections left after the test) conducted after 6 months' outdoor exposure in case of wash primers of the high exposure resistance type or after 7 days' drying in a room in case of wash primers of the etching type.

In each of the salt spray test and outdoor exposure tests, the corrosion resistance was evaluated according to the following scale:
⊙ : not changed
O : slight rusting and blistering
Δ : rusting and blistering on 10 to 50% of the total area
X : rusting and blistering on substantially entire area From the foregoing test results, it will readily be understood that coating compositions of the high exposure resistance type according to the present invention (Examples 1, 5 and 9) comprising a polyvinyl butyral resin, a phenolic resin, an organo functional silane, phosphoric acid and a polyphosphate compound and/or a borate compound are far superior to the conventional wash primer of the high exposure resistance type (Comparative Example 1) with respect to the long lasting corrosion resistance. Further, since these coating compositions of the present invention are free of chromium and cause no environmental pollution, they are far superior to the conventional wash primer with respect to operation safety, health maintenance and pollution-preventing effect. Moreover, in view of the ingredients constituting the coating compositions of the present invention, it will be apparent that they are much improved over the conventional zinc-rich paint with respect to weldability and adaptability to weld cutting.

Chromium-free paints formed by replacing a zinc chromate pigment by other corrosion-resistant pigment in the conventional wash primer of the high exposure resistance type (Comparative Examples 2 to 4) have no practical utility because they are much inferior to the conventional wash primer with respect to corrosion resistance.

It will also be apparent that coating compositions of the etching type according to the present invention (Examples 13, 17 and 21) comprising a polyvinyl butyral resin, an organo functional silane, phosphoric acid and a polyphosphate compound and/or a borate compound are superior to the conventional wash primer of the etching type (Comparative Example 5), the composition including a borate compound alone and being free of an organo functional silane (Comparative Example 6), and the composition including a polyphosphate alone and being free of an organo functional silane (Comparative Example 7) with respect to corrosion resistance, operation safety and pollution-preventing effect. Moreover, they are superior to the known coating composition comprising a borate compound with respect to the corrosion resistance.

EXAMPLE 25

| Main Composition Ingredients | Parts |
|---|---|
| Phenolic resin (Hitanol 4020 mentioned above) | 11.0 |
| Polyvinyl butyral resin (S-LEC BM-2 mentioned above) | 9.0 |
| Organo functional silane (KBM 303 mentioned above) | 0.5 |
| Yellow iron oxide (Mapico Yellow) | 3.0 |
| Carbon black | 0.3 |
| Phthalocyanine Blue | 0.3 |
| Barium borate (Busan 11-M1) | 2.5 |
| Aluminum polyphosphate (K-82) | 2.5 |
| Talc | 1.0 |
| Aluminum powder paste (solid content = 64%; mineral terpene solution; product manufactured and sold under tradename "Alpaste 1100N" by Toyo Aluminum Co., Ltd.) | 5.0 |
| Suspending agent (organic bentonite) | 1.0 |
| Butyl alcohol | 11.0 |
| Isopropyl alcohol | 22.9 |
| Toluol | 30.0 |
| Total | 100.0 |

| Additive Ingredients | Parts |
|---|---|
| 85% Aqueous solution of phosphoric acid | 9.0 |
| Water | 5.0 |
| Isopropyl alcohol | 86.0 |
| Total | 100.0 |

Ingredients of the main composition except the aluminum powder paste were kneaded and ground overnight, and the prescribed amount of the aluminum powder paste was added to the kneaded mixture and uniformly dispersed therein to form the main composition. Then, 80 parts of the thus formed main composition was mixed with 20 parts of the additive to form a coating composition of the present invention.

The thus formed coating composition was applied to a steel plate by means of an air spray so that the thickness of the resulting coating was 20μ and was dried in a room maintained at a temperature of 20° C and a relative humidity of 75% for 3 days. The resulting coating was subjected to comparison tests to obtain the results shown in Table 8.

Electroprint marking was carried out in the following manner:

A mixture comprising 10 parts of a silicone resin (50% solution in a mixed solvent of xylol and toluol), 10 parts of a vinyl acetate resin (50% solution in a mixed solvent of xylol and toluol), 50 parts of zinc oxide, 20 parts of xylol and 10 parts of ethyl acetate was blended and dispersed in a ball mill, and the resulting dispersion was heated, dried and pulverized to obtain a photoconductive powder having an average particle size of 20μ.

The thus prepared photoconductive powder was uniformly scattered on a steel plate coated with the above-mentioned coating composition by an electrostatic powder coating machine, and the coated steel plate was exposed to rays projected from a xenon lamp through a positive original to form an electrostatic latent image. The photoconductive powder on exposed areas was selectively removed and recovered by application of pneumatic pressure to obtain a marked visible image. Then, the image was fixed by heating at 130° C for 30 minutes.

EXAMPLES 26 TO 36

Ingredients of a main composition indicated in Table 5 were kneaded and ground in the same manner as described in Example 25 and 85 parts of the resulting main composition was mixed with 15 parts of the same additive as used in Example 25. The resulting composition was applied, dried and tested in the same manner as described in Example 25.

It was found that each of the thus prepared compositions was as excellent in corrosion resistance of the coating and adaptability to the electroprint marking process as the coating composition obtained in Example 25.

Table 5
Amounts (parts) of Ingredients in Main Composition

| Ingredients | Example 26 | Example 27 | Example 28 |
|---|---|---|---|
| Phenolic resin | 8.0 | 9.0 | 7.0 |
| Polyvinyl butyral resin | 9.0 | 9.0 | 9.0 |
| Organo functional silane | 0.3[1) | 1.0[2) | 1.3[3) |
| Yellow iron oxide | 3.0 | 3.0 | 3.0 |
| Carbon black | 0.3 | 0.3 | 0.3 |
| Phthalocyanine Blue | 0.3 | 0.3 | 0.3 |
| Borate compound | 5.0[5) | 15.0[6) | 10.0[7) |
| Polyphosphate compound | 5.0[8) | 5.0[9) | 10.0[9) |
| Aluminum powder paste[11) | 5.0 | 3.0 | 7.0 |
| Suspending agent | 1.0 | 1.0 | 1.0 |
| Talc | — | — | — |
| Butyl alcohol | 11.0 | 11.0 | 11.0 |
| Isopropyl alcohol | 23.2 | 22.0 | 18.0 |
| Toluol | 28.9 | 20.4 | 22.1 |
| Total | 100.0 | 100.0 | 100.0 |

| Ingredients | Example 29 | Example 30 | Example 31 |
|---|---|---|---|
| Phenolic resin | 11.0 | 8.0 | 9.0 |
| Polyvinyl butyral resin | 9.0 | 9.0 | 9.0 |
| Organo functional silane | 0.5[4) | 0.3[1) | 1.0[2) |
| Yellow iron oxide | 3.0 | 3.0 | 0.3 |
| Carbon black | 0.3 | 0.3 | 0.3 |
| Phthalocyanine Blue | 0.3 | 0.3 | 0.3 |
| Borate compound | 5.0[7) | 10.0[7) | 20.0[5) |
| Polyphosphate compound | — | — | — |
| Aluminum powder paste[11) | 5.0 | 6.0 | 4.0 |
| Suspending agent | 1.0 | 1.0 | 1.0 |
| Talc | 3.9 | — | — |
| Butyl alcohol | 11.0 | 11.0 | 11.0 |
| Isopropyl alcohol | 25.0 | 22.2 | 21.0 |
| Toluol | 30.0 | 28.9 | 23.1 |
| Total | 100.0 | 100.0 | 100.0 |

Table 5-continued
Amounts (parts) of Ingredients in Main Composition

| Ingredients | Example 32 | Example 33 | Example 34 |
|---|---|---|---|
| Phenolic resin | 7.0 | 11.0 | 8.0 |
| Polyvinyl butyral resin | 9.0 | 9.0 | 9.0 |
| Organo functional silane | 1.3[3) | 0.5[4) | 0.3[1) |
| Yellow iron oxide | 3.0 | 3.0 | 3.0 |
| Carbon black | 0.3 | 0.3 | 0.3 |
| Phthalocyanine Blue | 0.3 | 0.3 | 0.3 |
| Borate compound | 20.0[6) | — | — |
| Polyphosphate compound | — | 5.0[8) | 10.0[9) |
| Aluminum powder paste[11) | 7.0 | 5.0 | 5.0 |
| Suspending agent | 1.0 | 1.0 | 1.0 |
| Talc | — | 3.9 | — |
| Butyl alcohol | 11.0 | 11.0 | 11.0 |
| Isopropyl alcohol | 18.0 | 20.0 | 23.2 |
| Toluol | 22.1 | 30.0 | 28.9 |
| Total | 100.0 | 100.0 | 100.0 |

| Ingredients | Example 35 | Example 36 |
|---|---|---|
| Phenolic resin | 9.0 | 7.0 |
| Polyvinyl butyral resin | 9.0 | 9.0 |
| Organo functional silane | 1.0[2) | 1.3[3) |
| Yellow iron oxide | 3.0 | 3.0 |
| Carbon black | 0.3 | 0.3 |
| Phthalocyanine Blue | 0.3 | 0.3 |
| Borate compound | — | — |
| Polyphosphate compound | 20.0[8) | 20.0[10) |
| Aluminum powder paste[11) | 3.0 | 7.0 |
| Suspending agent | 1.0 | 1.0 |
| Talc | — | — |
| Butyl alcohol | 11.0 | 11.0 |
| Isopropyl alcohol | 22.0 | 18.0 |
| Toluol | 20.4 | 22.1 |
| Total | 100.0 | 100.0 |

Notes
[1)KBM 403 mentioned above
[2)KBM 503 mentioned above
[3)Mixture of equal amounts of KBM 303 and KBM 403 mentioned above
[4)KBM 303 mentioned above
[5)Zinc borate (2ZnO · 3B$_2$O$_3$ · 3 · 5H$_2$O)
[6)Mixture of equal amounts of barium borate (BaB$_2$O$_4$ · H$_2$O) and zinc borate
[7)Barium borate (BaB$_2$O$_4$ · H$_2$O)
[8)Aluminum polyphosphate (same as used in Example 1)
[9)Zinc polyphosphate (same as used in Example 3)
[10)Mixture of aluminum polyphosphate and zinc polyphosphate (mixing weight ratio = 1:1)
[11)Product manufactured and sold under tradename "Alpaste 1700 NL" by Toyo Aluminum Co., Ltd. (solid content = 64%; mineral terpene solution)

EXAMPLE 37

| Main Composition Ingredients | Parts |
|---|---|
| Polyvinyl butyral resin | 9.0 |
| Organo functional silane (KBM 303 mentioned above) | 0.5 |
| Barium borate | 2.5 |
| Aluminum polyphosphate (same as used in Example 25) | 2.5 |
| Talc | 5.0 |
| Aluminum alloy powder paste (aluminum/zinc weight ratio = 95/5; solid content = 64%; mineral terpene solution) | 5.0 |
| Isopropyl alcohol | 55.0 |
| Butyl alcohol | 20.0 |
| Total | 100.0 |

| Additive Ingredients | Parts |
|---|---|
| 85% Aqueous solution of phosphoric acid | 18.0 |
| Water | 16.0 |
| Isopropyl alcohol | 66.0 |
| Total | 100.0 |

The ingredients of the main composition were kneaded and ground in the same manner as in Example 25, and 80 parts of the resulting main composition was mixed with 20 parts of the additive to obtain a coating composition of the present invention. The coating composition was applied, dried and tested in the same manner as in Example 25 to obtain results shown in Table 8.

EXAMPLES 38 to 48

Ingredients of a main composition indicated in Table 6 were kneaded and ground, and 85 parts of the resulting main composition were mixed with 15 parts of the same additive as used in Example 37. The resulting compositions were subjected to comparison tests in the same manner as described in Example 25. It was found that each coating composition was as excellent as the coating composition obtained in Example 37 with respect to corrosion resistance of the resulting coating and adaptability to the electroprint marking process.

Table 6

| Example No. | Polyvinyl Butyral Resin | Organo Functional Silane | Borate Compound | Polyphosphate Compound | Isopropyl Alcohol | Butyl Alcohol | Talc | Aluminum Powder Paste | Total |
|---|---|---|---|---|---|---|---|---|---|
| 38 | 9.0 | 0.3[1] | 2.5[5] | 2.5[6] | 56.5 | 20.2 | 5.0 | 4.0[11] | 100.0 |
| 39 | 9.0 | 1.0[2] | 5.0[6] | 5.0[9] | 53.5 | 19.5 | — | 7.0[11] | 100.0 |
| 40 | 9.0 | 1.3[3] | 5.0[5] | 5.0[10] | 55.5 | 19.2 | — | 5.0[11] | 100.0 |
| 41 | 9.0 | 0.5[4] | 5.0[6] | — | 55.5 | 20.0 | 5.0 | 5.0[12] | 100.0 |
| 42 | 9.0 | 0.3[1] | 10.0[6] | — | 52.5 | 20.2 | — | 8.0[11] | 100.0 |
| 43 | 9.0 | 1.0[2] | 5.0[5] | — | 54.5 | 19.5 | 5.0 | 6.0[11] | 100.0 |
| 44 | 9.0 | 1.3[3] | 10.0[7] | — | 57.5 | 19.2 | — | 3.0[11] | 100.0 |
| 45 | 9.0 | 0.5[4] | — | 5.0[8] | 55.5 | 20.0 | 5.0 | 5.0[12] | 100.0 |
| 46 | 9.0 | 0.3[1] | — | 10.0[8] | 56.5 | 20.2 | — | 4.0[11] | 100.0 |
| 47 | 9.0 | 1.0[2] | — | 5.0[10] | 54.5 | 19.5 | 5.0 | 6.0[11] | 100.0 |
| 48 | 9.0 | 1.3[3] | — | 10.0[9] | 55.5 | 19.2 | — | 5.0[11] | 100.0 |

Notes
[1] KBM 403 mentioned above
[2] KBM 503 mentioned above
[3] Mixture of KBM 303 and KBM 503 mentioned above (mixing weight ratio = 1:2)
[4] KBM 303 mentioned above
[5] Zinc borate mentioned above
[6] Barium metaborate mentioned above
[7] Mixture of barium metaborate and zinc borate (mixing weight ratio = 1:2)
[8] Aluminum polyphosphate same as used in Example 1
[9] Zinc polyphosphate same as used in Example 3
[10] Calcium polyphosphate same as used in Example 19
[11] Alpaste 1100 N mentioned above
[12] Aluminum alloy powder paste same as used in Example 37

COMPARATIVE EXAMPLES 10 to 17

Ingredients of a main composition indicated in Table 7 were kneaded and ground in the same manner as described in Example 37, and 80 parts of the thus formed main composition were mixed with 20 parts of an additive indicated in Table 7 to form a coating composition. The resulting coating composition was tested in the same manner as described in Example 37 to obtain the results shown in Table 8.

Table 7

| Ingredients | Comparative Example 10 | Comparative Example 11 |
|---|---|---|
| Main Composition | | |
| Phenolic resin | 11.0 | 11.0 |
| Polyvinyl butyral resin | 9.0 | 9.0 |
| Yellow iron oxide | 3.0 | 3.0 |
| Carbon black | 0.3 | 0.3 |
| Phthalocyanine Blue | 0.3 | 0.3 |
| Zinc chromate | 5.0 | — |
| Suspending agent | 1.0 | 1.0 |
| Barium metaborate | — | 10.0 |
| Aluminum polyphosphate | — | — |
| Zinc molybdate[1] | — | — |
| Aluminum powder paste[2] | 5.0 | 5.0 |
| Talc | — | — |
| Butyl alcohol | 11.0 | 11.0 |
| Isopropyl alcohol | 20.0 | 20.0 |
| Toluol | 34.4 | 29.4 |
| Additive | | |
| 85% Aqueous solution of phosphoric acid | 9.4 | 9.0 |
| Chromic anhydride | 0.2 | — |
| Water | 4.5 | 5.0 |
| Isopropyl alcohol | 85.9 | 86.0 |

| Ingredients | Comparative Example 12 | Comparative Example 13 |
|---|---|---|
| Main Composition | | |
| Phenolic resin | 11.0 | 11.0 |
| Polyvinyl butyral resin | 9.0 | 9.0 |
| Yellow iron oxide | 3.0 | 3.0 |
| Carbon black | 0.3 | 0.3 |
| Phthalocyanine Blue | 0.3 | 0.3 |
| Zinc chromate | — | — |
| Suspending agent | 1.0 | 1.0 |
| Barium metaborate | — | — |
| Aluminum polyphosphate | 10.0 | — |
| Zinc molybdate[1] | — | 10.0 |
| Aluminum powder paste[2] | 5.0 | — |
| Talc | — | — |
| Butyl alcohol | 11.0 | 11.0 |
| Isopropyl alcohol | 20.0 | 25.0 |
| Toluol | 29.4 | 29.4 |
| Additive | | |
| 85% Aqueous solution of phosphoric acid | 9.0 | 9.0 |
| Chromic anhydride | — | — |
| Water | 5.0 | 5.0 |
| Isopropyl alcohol | 86.0 | 86.0 |

| Ingredients | Comparative Example 14 | Comparative Example 15 |
|---|---|---|
| Main Composition | | |
| Phenolic resin | — | — |
| Polyvinyl butyral resin | 9.0 | 9.0 |
| Yellow iron oxide | — | — |
| Carbon black | — | — |
| Phthalocyanine Blue | — | — |
| Zinc chromate | 8.6 | — |
| Suspending agent | — | — |
| Barium metaborate | — | 10.0 |
| Aluminum polyphosphate | — | — |
| Zinc molybdate[1] | — | — |
| Aluminum powder paste[2] | — | 5.0 |
| Talc | 1.4 | — |
| Butyl alcohol | 20.0 | 20.0 |
| Isopropyl alcohol | 61.0 | 56.0 |
| Toluol | — | — |
| Additive | | |
| 85% Aqueous solution of phosphoric acid | 18.0 | 18.0 |
| Chromic anhydride | — | — |
| Water | 16.0 | 16.0 |
| Isopropyl alcohol | 66.0 | 66.0 |

| Ingredients | Comparative Example 16 | Comparative Example 17 |
|---|---|---|
| Main Composition | | |

Table 7-continued

| | Amounts (parts) of Ingredients of Main Composition and Additive | |
|---|---|---|
| Phenolic resin | — | — |
| Polyvinyl butyral resin | 9.0 | 9.0 |
| Yellow iron oxide | — | — |
| Carbon black | — | — |
| Phthalocyanine Blue | — | — |
| Zinc chromate | — | — |
| Suspending agent | — | — |
| Barium metaborate | — | — |
| Aluminum polyphosphate | 10.0 | — |
| Zinc molybdate[1] | — | 10.0 |
| Aluminum powder paste[2] | 5.0 | 5.0 |
| Talc | — | — |
| Butyl alcohol | 20.0 | 20.0 |
| Isopropyl alcohol | 56.0 | 56.0 |
| Toluol | — | — |
| Additive | | |
| 85% Aqueous solution of phosphoric acid | 18.0 | 18.0 |
| Chromic anhydride | — | — |
| Water | 16.0 | 16.0 |
| Isopropyl alcohol | 66.0 | 66.0 |

Table 8

| | Test Results | | |
|---|---|---|---|
| | Salt Spray Test[1] | | |
| Sample Coating | 50 hours | 100 hours | 200 hours |
| Example 25 | ⊙ | ⊙ | ⊙ |
| Example 29 | ⊙ | ⊙ | ⊙ |
| Example 33 | ⊙ | ⊙ | ⊙ |
| Example 37 | ⊙ | O | — |
| Example 38 | ⊙ | O | — |
| Example 42 | ⊙ | O | — |
| Example 45 | ⊙ | O | — |
| Example 46 | ⊙ | O | — |
| Comparative Example 10 | ⊙ | O | X |
| Comparative Example 11 | Δ | X | — |
| Comparative Example 12 | Δ | X | — |
| Comparative Example 13 | Δ | X | — |
| Comparative Example 14 | O - ⊙ | X | — |
| Comparative Example 15 | X | — | — |
| Comparative Example 16 | X | — | — |
| Comparative Example 17 | X | — | — |

| | Outdoor Exposure Test[2] | | |
|---|---|---|---|
| Sample Coating | 3 months | 6 months | 9 months |
| Example 25 | ⊙ | ⊙ | ⊙ |
| Example 29 | ⊙ | ⊙ | ⊙ |
| Example 33 | ⊙ | ⊙ | ⊙ |
| Example 37 | — | — | — |
| Example 38 | — | — | — |
| Example 42 | — | — | — |
| Example 45 | — | — | — |
| Example 46 | — | — | — |
| Comparative Example 10 | ⊙ | O | X |
| Comparative Example 11 | Δ | X | — |
| Comparative Example 12 | Δ | X | — |
| Comparative Example 13 | Δ | X | — |
| Comparative Example 14 | — | — | — |
| Comparative Example 15 | — | — | — |
| Comparative Example 16 | — | — | — |
| Comparative Example 17 | — | — | — |

| | Adaptability to Electroprint Marking Process | | |
|---|---|---|---|
| Sample Coating | Resolution of Image[3] | Recovery Loss of Photoconductive Powder[4] | Sensitivity[5] (seconds) |
| Example 25 | good | below 1% | 9 |
| Example 29 | good | below 1% | 10 |

Table 8-continued

| | Test Results | | |
|---|---|---|---|
| Example 33 | good | below 1% | 8 |
| Example 37 | good | below 1% | 10 |
| Example 38 | good | below 1% | 10 |
| Example 42 | good | below 1% | 9 |
| Example 45 | good | below 1% | 8 |
| Example 46 | good | below 1% | 9 |
| Comparative Example 10 | good | below 1% | 10 |
| Comparative Example 11 | good | below 1% | 10 |
| Comparative Example 12 | good | below 1% | 10 |
| Comparative Example 13 | bad | 10% | 30 |
| Comparative Example 14 | bad | 10% | 30 |
| Comparative Example 15 | good | below 1% | 10 |
| Comparative Example 16 | good | below 1% | 10 |
| Comparative Example 17 | good | below 1% | 10 |

Notes
[1] The salt spray test was conducted by using 5% aqueous solution of NaCl. The test results were evaluated according to the scale indicated below
[2] The outdoor exposure test results were evaluated according to the scale indicated below
[3] The resolution of the image was evaluated by naked eye observation
[4] The recovery loss of the photoconductive powder was calculated according to the following formula: Recovery Loss (%) = $\frac{\text{Amount Applied} - \text{Amount Recovered}}{\text{Amount Applied}} \times 100$
[5] The sensitivity is expressed in terms of the time (seconds) during which the sensitivity was attenuated under 60 luxes In each of the salt spray test and outdoor exposure test, the corrosion resistance was evaluated according to the following scale:

⊙ : not changed
O : slight rusting and blistering
Δ: rusting and blistering on 10 to 50% of the total area
X: rusting and blistering on substantially entire area From the test results shown in Table 8, it will readily be understood that coating compositions of the high exposure resistance type according to the present invention (Examples 25, 29 and 33) comprising a polyvinyl butyral resin, a phenolic resin, an organo functional silane, a borate compound and/or a polyphosphate compound, a metal powder and phosphoric acid are superior to the conventional wash primer of the high exposure resistance type (Comparative Example 10) with respect to long lasting corrosion resistance. Further, it is apparent that since these coating compositions are chromium-free paints causing no pollution, they are far superior to the conventional wash primer of the high exposure resistance type with respect to operation safety, health maintenance and the effect of preventing environmental pollution. Moreover, it is seen that these coating compositions are superior or comparable to the conventional wash primer with respect to adaptability to the electroprint marking process. Still further, in view of the constituents of these coating compositions according to the present invention, it is apparent that they are much improved over the conventional zinc-rich paint with respect to weldability.

Chromium-free paints formed by replacing a zinc chromate pigment by other anticorrosion pigment in the conventional wash primer of the high exposure resistance type (Comparative Examples 11 to 13) are much inferior to the conventional wash primer with respect to corrosion resistance and they have no practical utility at all.

It will also be apparent that coating compositions of the etching type according to the present invention (Examples 37, 38, 42, 45 and 46) comprising a polyvinyl butyral resin, an organo functional silane, a borate compound and/or a polyphosphate compound, a metal powder and phosphoric acid are superior to the conventional wash primer to the etching type (Comparative Example 14), the composition including a borate alone and being free of an organo functional silane (Comparative Example 15), the composition including a polyphosphate alone and being free of an organo functional silane (Comparative Example 16) and the composition including zinc molybdate (Comparative Example 17) with respect to corrosion resistance, operation safety, health maintenance, the effect of preventing environmental pollution and adaptability to the electroprint marking process.

What is claimed is:

1. An anticorrosion primer coating composition comprising
   (i) 100 parts by weight of a polyvinyl butyral resin,
   (ii) 1 to 25 parts by weight of at least one organo functional silane selected from the group consisting of aminoalkoxysilane compounds represented by the following general formula:

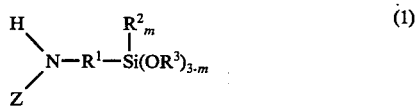

wherein $R^1$ stands for a divalent hydrocarbon group having 1 to 4 carbon atoms, $R^2$ and $R^3$ represent a monovalent hydrocarbon group having 1 to 4 carbon atoms, Z stands for a hydrogen atom or an aminoalkyl group, and $m$ is 1 or 0, and alkylalkoxysilane compounds represented by the following general formula:

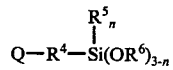

wherein $R^4$ stands for a divalent hydrocarbon group having 1 to 4 carbon atoms, $R^5$ and $R^6$ represent a monovalent hydrocarbon group having 1 to 4 carbon atoms, Q stands for a methacryloxy, acryloxy, glycidoxy or epoxycyclohexyl group, and $n$ is 1 or 0.
   (iii) 20 to 350 parts by weight of at least one member selected from the group consisting of inorganic borate compounds and polyphosphate compounds and (iv) 5 to 50 parts by weight of phosphoric acid.

2. An anticorrosion primer coating composition as set forth in claim 1 wherein the component (iii) is a mixture of a borate compound and a polyphosphate compound in which the mixing weight ratio is in the range of from 1/9 to 9/1.

3. An anticorrosion primer coating composition as set forth in claim 1 wherein the component (ii) is at least one member selected from the group consisting of β-(3,4-epoxycyclohexy)-ethyltrimethoxysilane, γ-glycidoxypropyltrimethoxysilane and γ-methacryloxypropyltrimethoxysilane.

4. An anticorrosion primer coating composition as set forth in claim 1 wherein the borate compound is at least one member selected from the group consisting of barium metaborate, zinc borate, sodium tetraborate, barium tetraborate, magnesium metaborate and aluminum orthoborate.

5. An anticorrosion primer coating composition as set forth in claim 1 wherein the polyphosphate compound is at least one member selected from the group consisting of aluminum polyphosphate, zinc polyphosphate and calcium polyphosphate.

6. An anticorrosion primer coating composition as set forth in claim 1 which further comprises up to 200 parts by weight of a phenolic resin.

7. An anticorrosion primer coating composition as set forth in claim 6 which further comprises 10 to 130 parts by weight of a metal powder.

8. An anticorrosion primer coating composition as set forth in claim 7 wherein the metal powder is at least one member selected from the group consisting of powders of metallic aluminum and aluminum alloys.

9. An anticorrosion primer coating composition as set forth in claim 1 which further comprises 10 to 130 parts by weight of a metal powder.

10. An anticorrosion primer coating composition as set forth in claim 9 wherein metal powder is at least one member selected from the group consisting of powders of metallic aluminum and aluminum alloys.

* * * * *